United States Patent
Long

(10) Patent No.: US 12,349,010 B2
(45) Date of Patent: Jul. 1, 2025

(54) METHOD AND APPARATUS FOR HANDOVER

(71) Applicant: Telefonaktiebolaget LM Ericsson (publ), Stockholm (SE)

(72) Inventor: Hongxia Long, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 269 days.

(21) Appl. No.: 17/910,013

(22) PCT Filed: Mar. 11, 2021

(86) PCT No.: PCT/CN2021/080193
§ 371 (c)(1),
(2) Date: Sep. 8, 2022

(87) PCT Pub. No.: WO2021/180170
PCT Pub. Date: Sep. 16, 2021

(65) Prior Publication Data
US 2023/0121491 A1   Apr. 20, 2023

(30) Foreign Application Priority Data
Mar. 13, 2020   (WO) ................ PCT/CN2020/079269

(51) Int. Cl.
*H04W 36/00* (2009.01)
*H04W 12/06* (2021.01)
*H04W 36/14* (2009.01)

(52) U.S. Cl.
CPC ....... *H04W 36/0038* (2013.01); *H04W 12/06* (2013.01); *H04W 36/142* (2023.05)

(58) Field of Classification Search
CPC ............. H04W 36/0038; H04W 12/06; H04W 36/142; H04W 36/08; H04W 36/12
(Continued)

(56) References Cited

U.S. PATENT DOCUMENTS

2019/0029065 A1   1/2019   Park et al.
2019/0182718 A1   6/2019   Shan
(Continued)

FOREIGN PATENT DOCUMENTS

CN   109964453 A   7/2019
CN   109964509 A   7/2019
(Continued)

OTHER PUBLICATIONS

China Mobile, et al., "S2-2002262: NSSAA procedure clarification," 3GPP TSG-SA2 Meeting #137E, Feb. 24-27, 2020, Electronic Meeting, 3 pages.
(Continued)

*Primary Examiner* — Don N Vo
(74) *Attorney, Agent, or Firm* — Withrow & Terranova, PLLC

(57) ABSTRACT

Embodiments of the present disclosure provide methods and apparatuses for handover. A method at a first access and mobility management entity comprises obtaining at least one authentication and authorization status for a terminal device for at least one network slice of a network. The method further comprises sending the at least one authentication and authorization status for the terminal device for at least one network slice of the network to a second access and mobility management entity during a handover procedure.

15 Claims, 9 Drawing Sheets

(58) Field of Classification Search
USPC .......................................................... 455/411
See application file for complete search history.

(56) References Cited

U.S. PATENT DOCUMENTS

| | | | |
|---|---|---|---|
| 2020/0053083 A1 | 2/2020 | Kunz et al. | |
| 2021/0058467 A1* | 2/2021 | Zhu | H04W 24/04 |
| 2021/0160769 A1* | 5/2021 | Tiwari | H04W 48/16 |
| 2023/0067830 A1* | 3/2023 | Tiwari | H04W 12/06 |

FOREIGN PATENT DOCUMENTS

| | | |
|---|---|---|
| WO | 2019098745 A1 | 5/2019 |
| WO | 2019219619 A1 | 11/2019 |

OTHER PUBLICATIONS

Samsung, "S2-2002183: Handling of NSSAA during N2 handover procedure," 3GPP TSG-SA WG2 Meeting #137E, Feb. 24-27, 2020, Electronic Meeting, 3 pages.

Office Action for Canadian Patent Application No. 3171212, mailed Nov. 21, 2023, 5 pages.

Extended European Search Report for European Patent Application No. 21767463.9, mailed Mar. 7, 2024, 13 pages.

Author Unknown, "Technical Specification Group Services and System Aspects; System architecture for the 5G System (5GS); Stage 2 (Release 16)," Technical Specification 23.501, Version 16.3.0, Dec. 2019, 3GPP Organizational Partners, 417 pages.

Author Unknown, "Technical Specification Group Services and System Aspects; Procedures for the 5G System (5GS); Stage 2 (Release 16)," Technical Specification 23.502, Version 16.3.0, Dec. 2019, 3GPP Organizational Partner 558 pages.

Author Unknown, "Technical Specification Group Services and System Aspects; Security architecture and procedures for 5G system (Release 16)," Technical Specification 33.501, Version 16.1.0, Dec. 2019, 3GPP Organizational Partners, 202 pages.

Ericsson, "S2-2003129: Usage of NSSAA status at N2 based handover," 3GPP SA WG2 Meeting #S2-138E, Apr. 20-24, 2020, Electronic Meeting, 17 pages.

Huawei, et al., "S2-2002221: Correction on the value of S-NSSAIs for NSSAA," 3GPP TSG-WG SA2 Meeting #137E, Electronic Meeting, Feb. 24-27, 2020, 21 pages.

International Search Report and Written Opinion for International Patent Application No. PCT/CN2021/080193, mailed Jun. 9, 2021, 11 pages.

First Office Action for Chinese Patent Application No. 202180020839.X, mailed Apr. 30, 2024, 10 pages.

Second Office Action for Chinese Patent Application No. 202180020839.X, mailed Nov. 16, 2024, 16 pages.

Ericsson, "S3-194212: DraftCR—Proposed call flow for Network Slice Specific Authentication and Authorization," 3GPP TSG-SA WG3 Meeting #97, Nov. 18-22, 2019, Reno, Nevada, 6 pages.

Nokia, et al., "S2-175693: Network Slice access subscription management by a third party," 3GPP SA WG2 Meeting #122bis, Aug. 21-25, 2017, Sophia Antipolis, France, 6 pages.

Notification to Grant for Chinese Patent Application No. 202180020839.X, mailed May 1, 2025, 10 pages.

* cited by examiner

METHOD AND APPARATUS FOR HANDOVER

This application is a 35 U.S.C. § 371 national phase filing of International Application No. PCT/CN2021/080193, filed Mar. 11, 2021, which claims the benefit of International Application No. PCT/CN2020/079269, filed Mar. 13, 2020, the disclosures of which are incorporated herein by reference in their entireties.

TECHNICAL FIELD

The non-limiting and exemplary embodiments of the present disclosure generally relate to the technical field of communications, and specifically to methods and apparatuses for handover.

BACKGROUND

This section introduces aspects that may facilitate a better understanding of the disclosure. Accordingly, the statements of this section are to be read in this light and are not to be understood as admissions about what is in the prior art or what is not in the prior art.

A handover procedure may be used to hand over a terminal device such as user equipment (UE) from a source radio access network (RAN) (such as NG-RAN (next generation RAN)) node to a target RAN (such as NG-RAN) node using a reference point (such as N2) between the RAN and an access and mobility management entity (such as AMF (access and mobility management function)) or a reference point (such as Xn) between the source RAN and the target RAN. The handover procedure can be triggered, for example, due to new radio conditions, load balancing or due to specific service e.g. in the presence of QoS (quality of service) flow for voice, the source NG-RAN node being NR (new radio) may trigger handover to E-UTRA (evolved Universal Telecommunication Radio Access) connected to 5GC (fifth generation core network).

When the access and mobility management entity is changed during the handover procedure, the target access and mobility management entity may perform only a subset of a registration procedure. For example, in the 5GS (fifth generation system), if the UE indicates its support for network slice-specific authentication and authorization procedure (NSSAA) in the UE MM (Mobility Management) Core Network Capability in Registration Request, and any S-NSSAI (single network slice selection assistance information) of the HPLMN (Home PLMN (Public Land Mobile Network)) is subject to Network Slice-Specific Authentication and Authorization, the Network Slice-Specific Authentication and Authorization procedure needs to be executed.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

There are some problems for the handover procedure when the access and mobility management entity is changed. For example, during N2 based handover preparation phase, a source AMF may create the UE context in a target AMF, but the NSSAA status for allowed NSSAI (network slice selection assistance information) subject to Network Slice-Specific Authentication and Authorization is not contained in the UE context information. During N2 based handover execution phase, it is explicity specified that the target AMF performs only a subset of the Registration procedure, specifically the steps in the registration procedure for the context transfer between source AMF and target AMF are skipped. Therefore there is no way for the target AMF to get the NSSAA status of allowed NSSAIs subject to Network Slice-Specific Authentication and Authorization, and the target AMF has to execute the network Slice-Specific Authentication and Authorization again even the source AMF already has the NSSAA result.

To overcome or mitigate the above mentioned problems or other problems, the embodiments of the present disclosure propose an improved handover solution.

In an embodiment, a source access and mobility management entity can provide a target access and mobility management entity with the network slice-specific authentication and authorization status for allowed network slices subject to network slice-specific authentication and authorization during a handover procedure.

In an embodiment, the target access and mobility management entity, based on the network slice-specific authentication and authorization status from the source access and mobility management entity, decides to skip the network slice-specific authentication and authorization in the registration procedure for the network slice-specific authentication and authorization procedure and stores the network slice-specific authentication and authorization status from the source access and mobility management entity in the UE context for allowed network slice(s) subject to network slice-specific authentication and authorization during the handover.

In a first aspect of the disclosure, there is provided a method at a first access and mobility management entity. The method comprises obtaining at least one authentication and authorization status for a terminal device for at least one network slice of a network. The method further comprises sending the at least one authentication and authorization status for the terminal device for at least one network slice of the network to a second access and mobility management entity during a handover procedure.

In an embodiment, each of the at least one network slice of the network may be identified by single network slice selection assistance information, S-NSSAI.

In an embodiment, the handover procedure may be an inter next generation radio access network, NG-RAN, node N2 based handover procedure.

In an embodiment, the first access and mobility management entity may be an access and mobility management function, AMF, entity and the second access and mobility management entity may be an AMF entity.

In an embodiment, the at least one authentication and authorization status for the terminal device for at least one network slice of the network may be obtained from another access and mobility management entity and/or from an authentication server.

In an embodiment, the authentication server may be an authentication server function, AUSF, entity and said another access and mobility management entity may be an access and mobility management function, AMF, entity.

In an embodiment, the at least one authentication and authorization status for the terminal device for at least one network slice of the network may be sent in a request for the first access and mobility management entity to create a context of the terminal device in the second access and mobility management entity during the handover procedure.

In an embodiment, the request may be a Namf_Communication_CreateUEContext Request.

In an embodiment, the method may further comprise storing the at least one authentication and authorization status for the terminal device for at least one network slice of the network.

In a second aspect of the disclosure, there is provided a method at a second access and mobility management entity. The method comprises receiving, from a first access and mobility management entity, at least one authentication and authorization status for a terminal device for at least one network slice of a network during a handover procedure. The method further comprises deciding to skip at least one network slice-specific authentication and authorization procedure for the terminal device for the at least one network slice of the network based on the received at least one authentication and authorization status for the terminal device for at least one network slice of the network.

In an embodiment, the method further comprises skipping the at least one network slice-specific authentication and authorization procedure.

In an embodiment, the deciding to skip at least one network slice-specific authentication and authorization procedure further comprises deciding to skip at least one network slice-specific authentication and authorization procedure for the terminal device for the at least one network slice of the network if the received at least one authentication and authorization status indicates that the result of network slice-specific authentication and authorization is success.

In an embodiment, the deciding to skip at least one network slice-specific authentication and authorization procedure further comprises deciding to skip at least one network slice-specific authentication and authorization procedure for the terminal device for the at least one network slice of the network if the received at least one authentication and authorization status indicates that the result of network slice-specific authentication and authorization is failure.

In an embodiment, the method may further comprise checking whether there is one or more allowed network slices subject to network slice-specific authentication and authorization based on slice selection subscription data of the terminal device and whether there is one or more corresponding authentication and authorization statuses already available based on the received at least one authentication and authorization status for the terminal device for at least one network slice of the network.

In an embodiment, the method may further comprise storing the at least one authentication and authorization status for the terminal device for at least one network slice of the network.

In a third aspect of the disclosure, there is provided a first access and mobility management entity. The first access and mobility management entity comprise a processor; and a memory coupled to the processor, said memory containing instructions executable by said processor, whereby said first access and mobility management entity is operative to obtain at least one authentication and authorization status for a terminal device for at least one network slice of a network. Said first access and mobility management entity is further operative to send the at least one authentication and authorization status for the terminal device for at least one network slice of the network to a second access and mobility management entity during a handover procedure.

In a fourth aspect of the disclosure, there is provided a second access and mobility management entity. The second access and mobility management entity comprises a processor; and a memory coupled to the processor, said memory containing instructions executable by said processor, whereby said second access and mobility management entity is operative to receive, from a first access and mobility management entity, at least one authentication and authorization status for a terminal device for at least one network slice of a network during a handover procedure. Said second access and mobility management entity is further operative to decide to skip at least one network slice-specific authentication and authorization procedure for the terminal device for the at least one network slice of the network based on the received at least one authentication and authorization status for the terminal device for at least one network slice of the network.

In a fifth aspect of the disclosure, there is a first access and mobility management entity. The first access and mobility management entity comprises an obtaining module and a sending module. The obtaining module may be configured to obtain at least one authentication and authorization status for a terminal device for at least one network slice of a network. The sending module may be configured to send the at least one authentication and authorization status for the terminal device for at least one network slice of the network to a second access and mobility management entity during a handover procedure.

In a sixth aspect of the disclosure, there is provided a second access and mobility management entity. The second access and mobility management entity comprises a receiving module and a deciding module. The receiving module may be configured to receive, from a first access and mobility management entity, at least one authentication and authorization status for a terminal device for at least one network slice of a network during a handover procedure. The deciding module may be configured to decide to skip at least one network slice-specific authentication and authorization procedure for the terminal device for the at least one network slice of the network based on the received at least one authentication and authorization status for the terminal device for at least one network slice of the network.

In a seventh aspect of the disclosure, there is provided a computer program product, comprising instructions which, when executed on at least one processor, cause the at least one processor to carry out any step of the method according to any of the first and second aspects of the disclosure.

In an eighth aspect of the disclosure, there is provided a computer-readable storage medium storing instructions which when executed by at least one processor, cause the at least one processor to carry out any step of the method according to any of the first and second aspects of the disclosure.

Embodiments herein afford many advantages, of which a non-exhaustive list of examples follows. In some embodiments herein, during N2 based handover procedure, the target AMF could optimize the NSSAA procedure based on NSSAA status for allowed NSSAIs subject to Network Slice-Specific Authentication and Authorization during N2 based handover procedure provided by source AMF. In some embodiments herein, unnecessary network signaling traffic may be avoided during N2 based handover procedure. In some embodiments herein, for subscriber, fast service response time and minimized delay for the N2 based handover procedure may be achieved. In some embodiments herein, for network operator, OPEX (Operating Expense) reduction may be achieved as unnecessary signaling is avoided and network performance is improved. A person skilled in the art will recognize additional features and advantages upon reading the following detailed description.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
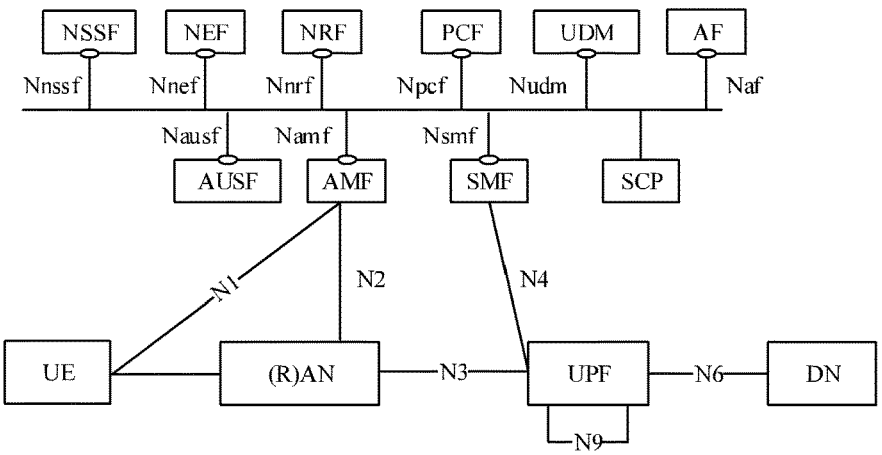
FIG. 1 shows a system architecture in which the embodiments of the present disclosure can be implemented.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable (wireless or wired) communication standards. For example, the wireless communication standards may comprise new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the wireless communication protocols as defined by a standard organization such as 3rd generation partnership project (3GPP) or the wired communication protocols. For example, the wireless communication protocols may comprise the first generation (1G), 2G, 3G, 4G, 4.5G, 5G communication protocols, and/or any other protocols either currently known or to be developed in the future.

The term "entity" used herein refers to a network device or network node or network function in a communication network. For example, in a wireless communication network such as a 3GPP-type cellular network, a core network device may offer numerous services to customers who are interconnected by an access network device. Each access network device is connectable to the core network device over a wired or wireless connection.

The term "network function (NF)" refers to any suitable function which can be implemented in a network entity (physical or virtual) of a communication network. For example, the 5G system (5GS) may comprise a plurality of NFs such as AMF (Access and Mobility Management Function), SMF (Session Management Function), AUSF (Authentication Service Function), UDM (Unified Data Management), PCF (Policy Control Function), AF (Application Function), NEF (Network Exposure Function), UPF (User plane Function) and NRF (Network Repository Function), RAN (radio access network), SCP (service communication proxy), NWDAF (network data analytics function), etc. In other embodiments, the network function may comprise different types of NFs for example depending on the specific network.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and B" should be understood to mean "only A, only B, or both A and B." The phrase "A and/or B" should be understood to mean "only A, only B, or both A and B."

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

It is noted that some embodiments of the present disclosure are mainly described in relation to 5G network being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

FIG. 1 shows a system architecture in which the embodiments of the present disclosure can be implemented. For simplicity, the system architecture of FIG. 1 only depicts some exemplary elements. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

Figure 4:
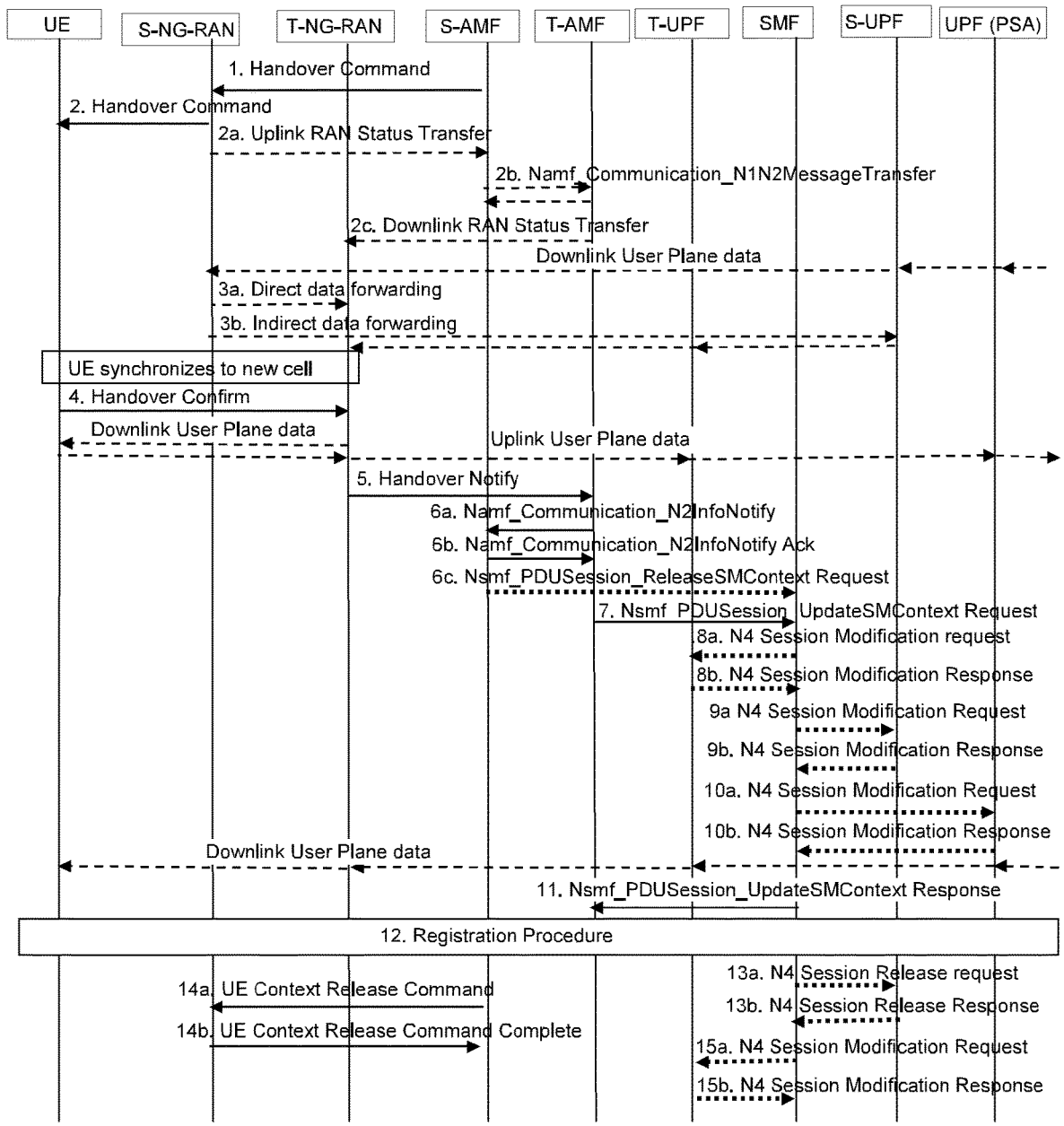
FIG. 4 shows a flowchart of a N2 based handover execution phase.

FIG. 1 is same as FIG. 4.2.3-1 of 3GPP TS 23.501 V16.3.0, the disclosure of which is incorporated by reference herein in its entirety. The system architecture of FIG. 1 may comprise some exemplary elements such as AMF, SMF, AUSF, UDM, PCF, AF, NEF, UPF and NRF, (R)AN, SCP, etc. The network elements, reference points and interfaces as shown in FIG. 1 may be same as the corresponding network elements, reference points and interfaces as described in 3GPP TS 23.501 V16.3.0.

Figure 2:
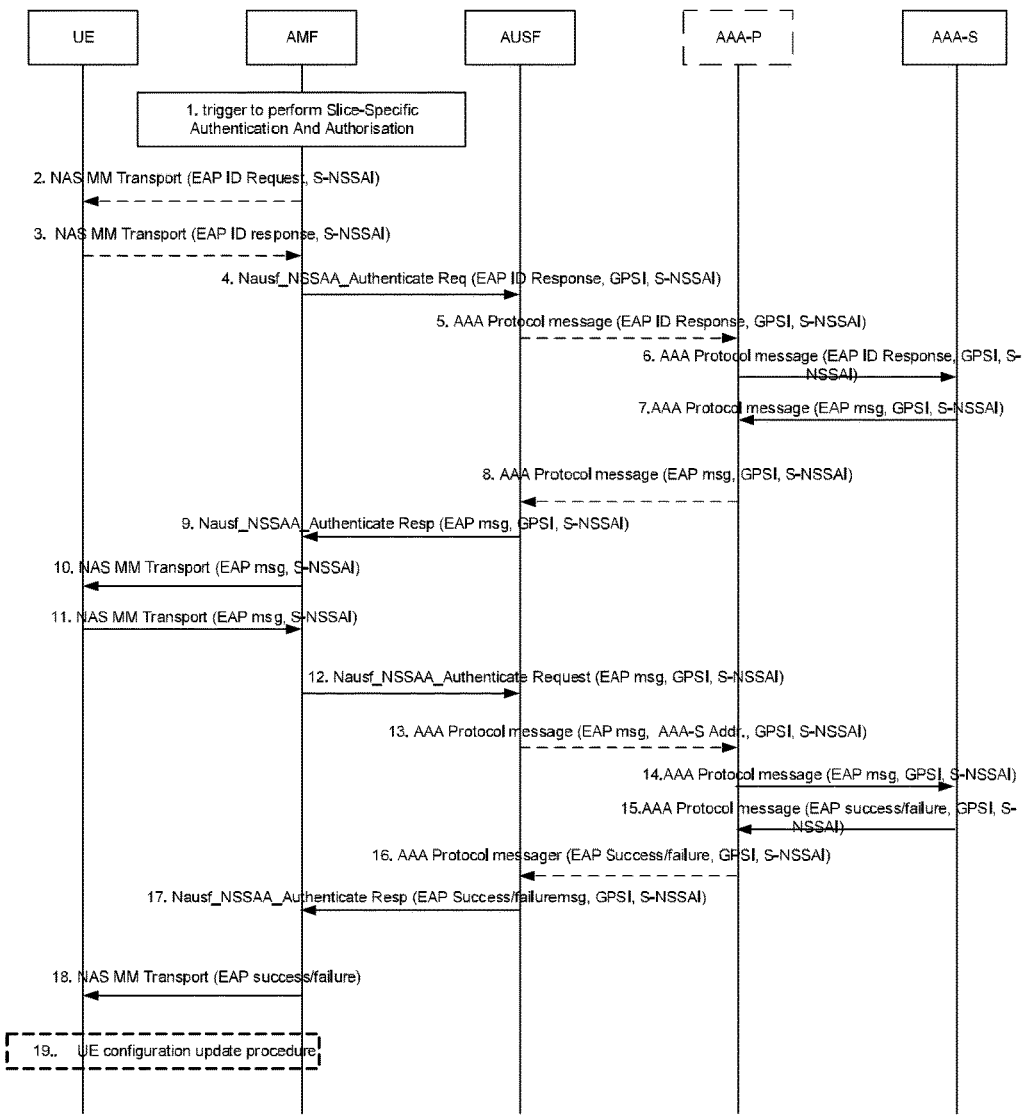
FIG. 2 shows a flowchart of a Network Slice-Specific Authentication and Authorization procedure.

FIG. 2 shows a flowchart of Network Slice-Specific Authentication and Authorization procedure, which is same as the FIG. 4.2.9.2-1 of 3GPP TS 23.502 V16.3.0. The steps as shown in FIG. 2 are same as the corresponding steps as described in clause 4.2.9.2 of 3GPP TS 23.502 V16.3.0. The Network Slice-Specific Authentication and Authorization procedure may be triggered for an S-NSSAI requiring Network Slice-Specific Authentication and Authorization with an AAA (authentication, authorization and accounting) Server (AAA-S) which may be hosted by the H-PLMN operator or by a third party which has a business relationship with the H-PLMN, using the EAP (Extensible Authentication Protocol) framework as described in 3GPP TS33.501 V16.1.0, the disclosure of which is incorporated by reference herein in its entirety. An AAA Proxy (AAA-P) in the HPLMN may be involved e.g. if the AAA Server belongs to a third party.

The Network Slice-Specific Authentication and Authorization procedure may be triggered by the AMF during a Registration procedure when some Network Slices require Slice-Specific Authentication and Authorization, when AMF determines that Network Slice-Specific Authentication and Authorization is requires for an S-NSSAI in the current Allowed NSSAI (e.g. subscription change), or when the AAA Server that authenticated the Network Slice triggers a re-authentication.

The AMF performs the role of the EAP Authenticator and communicates with the AAA-S via the AUSF. The AUSF undertakes any AAA protocol interworking with the AAA protocol supported by the AAA-S.

A serving PLMN may perform Network Slice-Specific Authentication and Authorization for the S-NSSAIs of the HPLMN which are subject to it based on subscription information. The UE may indicate in the Registration Request message in the UE 5GMM Core Network Capability whether it supports this feature. If the UE does not support this feature, the AMF may not trigger this procedure for the UE and if the UE requests these S-NSSAIs that are subject to Network Slice-Specific Authentication and Authorization they are rejected for the PLMN.

If a UE is configured with S-NSSAIs, which are subject to Network Slice-Specific Authentication and Authorization, the UE stores an association between the S-NSSAI and corresponding credentials for the Network Slice-Specific Authentication and Authorization.

To perform the Network Slice-Specific Authentication and Authorization for an S-NSSAI, the AMF invokes an EAP-based Network Slice-Specific authorization procedure documented in 3GPP TS 23.502 V16.3.0 clause 4.2.9 (see also 3GPP TS33.501 V16.1.0) for the S-NSSAI.

This procedure can be invoked for a supporting UE by an AMF at any time, e.g. when:
 a. The UE registers with the AMF and one of the S-NSSAIs of the HPLMN which maps to an S-NSSAI in the Requested NSSAI is requiring Network Slice-Specific Authentication and Authorization (see clause 5.15.5.2.1 for details), and can be added to the Allowed NSSAI by the AMF once the Network Slice-Specific Authentication and Authorization for the S-NSSAI succeeds; or
 b. The Network Slice-Specific AAA Server triggers a UE re-authentication and re-authorization for an S-NSSAI; or
 c. The AMF, based on operator policy or a subscription change, decides to initiate the Network Slice-Specific Authentication and Authorization procedure for a certain S-NSSAI which was previously authorized.

In the case of re-authentication and re-authorization (b. and c. above) the following applies:
 If S-NSSAIs that are requiring Network Slice-Specific Authentication and Authorization are included in the Allowed NSSAI for each Access Type, AMF selects an Access Type to be used to perform the Network Slice Specific Authentication and Authorization procedure based on network policies.
 If the Network Slice-Specific Authentication and Authorization for some S-NSSAIs in the Allowed NSSAI is unsuccessful, the AMF may update the Allowed NSSAI for each Access Type to the UE via UE Configuration Update procedure.
 If the Network Slice-Specific Authentication and Authorization fails for all S-NSSAIs in the Allowed NSSAI, the AMF may execute the Network-initiated Deregistration procedure described in clause 4.2.2.3.3 of 3GPP TS23.502 V16.3.0 and may include in the explicit De-Registration Request message the list of Rejected S-NSSAIs, each of them with the appropriate rejection cause value.

After a successful or unsuccessful UE Network Slice-Specific Authentication and Authorization, the UE context in the AMF may retain the authentication and authorization status for the UE for the related specific S-NSSAI of the HPLMN while the UE remains RM-REGISTERED in the PLMN, so that the AMF is not required to execute a Network Slice-Specific Authentication and Authorization for a UE at every Periodic Registration Update or Mobility Registration procedure with the PLMN.

A Network Slice-Specific AAA server may revoke the authorization or challenge the authentication and authorization of a UE at any time. When authorization is revoked for an S-NSSAI that is in the current Allowed NSSAI for an Access Type, the AMF may provide a new Allowed NSSAI to the UE and trigger the release of all PDU (Protocol Data Unit) sessions associated with the S-NSSAI, for this Access Type.

The AMF provides the GPSI (Generic Public Subscription Identifier) of the UE related to the S-NSSAI to the AAA Server to allow the AAA server to initiate the Network Slice-Specific Authentication and Authorization, or the Authorization revocation procedure, where the UE current AMF needs to be identified by the system, so the UE authorization status can be challenged or revoked.

The Network Slice-Specific Authentication and Authorization requires that the UE Primary Authentication and Authorization of the SUPI (Subscription Permanent Identifier) has successfully completed. If the SUPI authorization is revoked, then also the Network Slice-Specific authorization is revoked.

Figure 3:
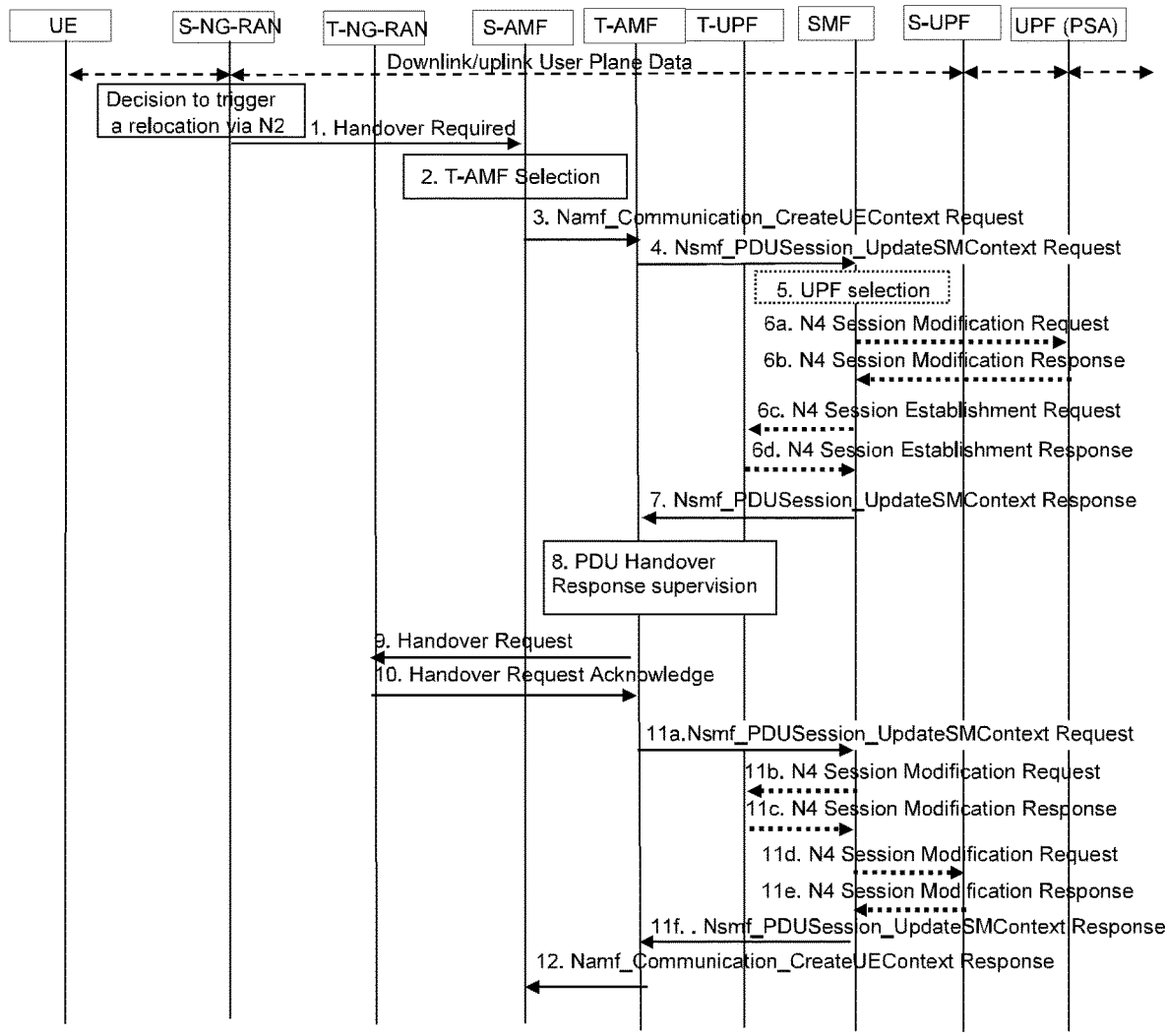
FIG. 3 shows a flowchart of a N2 based handover preparation phase.

FIG. 3 shows a flowchart of a N2 based handover preparation phase, which is same as the FIG. 4.9.1.3.2-1 of 3GPP TS 23.502 V16.3.0. The steps as shown in FIG. 3 are same as the corresponding steps as described in clause 4.9.1.3.2 of 3GPP TS 23.502 V16.3.0.

As shown in the step 3 of FIG. 3, (Conditional) S-AMF to T-AMF: Namf_Communication_CreateUEContext Request (N2 Information (Target ID (identifier), Source to Target transparent container, SM (Session Management) N2 information list, PDU Session IDs), UE context information (SUPI, Service area restriction, Allowed NSSAI for each Access Type if available, Tracing Requirements, LTE M Indication, the list of PDU Session IDs along with the corresponding SMF information and the corresponding S-NSSAI(s), PCF ID(s), DNN (Data Network Name), UE Radio Capability ID and UE Radio Capability Information). If the subscription information includes Tracing Requirements, the old AMF provides the target AMF with Tracing Requirements.

In inter PLMN mobility case, UE context information includes HPLMN S-NSSAIs corresponding to the Allowed NSSAI for each Access Type, without Allowed NSSAI of source PLMN. The target AMF may determine the Allowed NSSAI based on the HPLMN S-NSSAIs received in step 3 of FIG. 3, or else the target AMF queries the NSSF by invoking Nnssf_NSSelection_Get service operation with the HPLMN S-NSSAIs and PLMN ID of SUPI. The target AMF may trigger AMF re-allocation when Mobility Registration Update is performed during the Handover execution phase as described in FIG. 4.

The S-AMF initiates Handover resource allocation procedure by invoking the Namf_Communication_CreateUEContext service operation towards the T-AMF.

When the S-AMF can still serve the UE, the step 3 and step 12 of FIG. 3 are not needed.

If service area restrictions are available in the S-AMF, they may be forwarded to the T-AMF as described in clause 5.3.4.1.2 in 3GPP TS 23.501 V16.3.0.

If both Home and Visited PCF ID(s) are provided by the S-AMF, the T-AMF contacts the (V-) PCF identified by the (V-)PCF ID. If the (V-)PCF identified by the (V-)PCF ID is not used or there are no PCF ID(s) received from the S-AMF, the T-AMF may select the PCF(s) as described in 3GPP TS 23.501 V16.3.0, clause 6.3.7.1 and according to the V-NRF to H-NRF interaction described in clause 4.3.2.2.3.3 of 3GPP TS 23.502 V16.3.0. The T-AMF informs the S-AMF that the PCF ID is not used, as defined in step 12 of FIG. 3 and then the S-AMF terminates the AM Policy Association with the PCF identified by the PCF ID.

During N2 based handover preparation phase, the source AMF creates the UE context in target AMF as described in step 3 of FIG. 3, but the NSSAA status for allowed NSSAI subject to Network Slice-Specific Authentication and Authorization is not contained in the UE context information.

FIG. 4 shows a flowchart of a N2 based handover Execution phase, which is same as the FIG. 4.9.1.3.3-1 of 3GPP TS 23.502 V16.3.0. The steps as shown in FIG. 4 are same as the corresponding steps as described in clause 4.9.1.3.3 of 3GPP TS 23.502 V16.3.0.

As shown in the step 12 of FIG. 4, the UE initiates Mobility Registration Update procedure as described in clause 4.2.2.2.2 of 3GPP TS 23.502 V16.3.0. The target AMF knows that it is a Handover procedure and therefore the target AMF performs only a subset of the Registration procedure, specifically the steps (i.e., steps 4, 5, and 10 of FIG. 5) in the Registration procedure for the context transfer between source AMF and target AMF are skipped.

Figure 5:
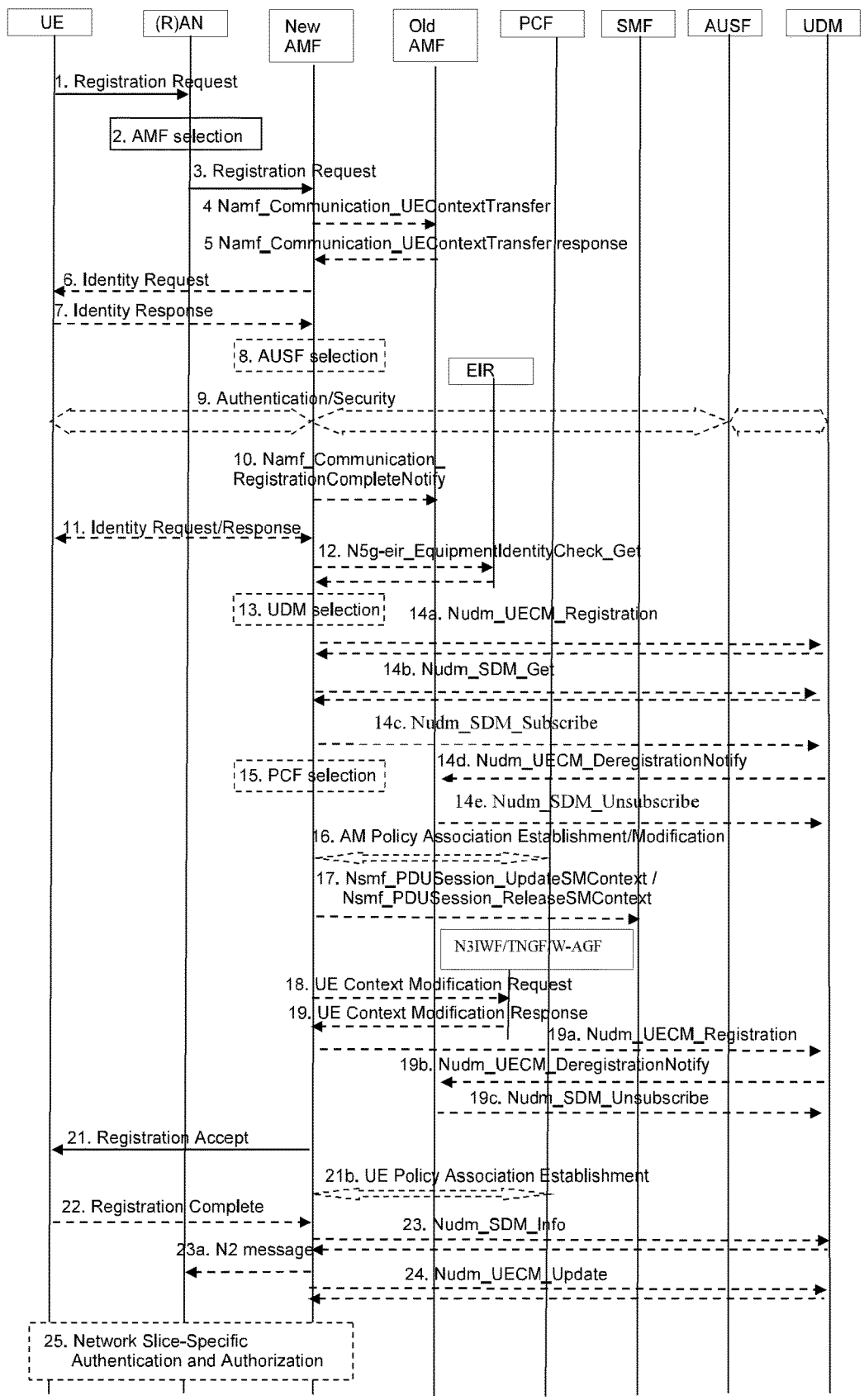
FIG. 5 shows a flowchart of a registration procedure.

FIG. 5 shows a flowchart of a registration procedure, which is same as the FIG. 4.2.2.2.2-1 of 3GPP TS 23.502 V16.3.0. The steps as shown in FIG. 5 are same as the corresponding steps as described in clause 4.2.2.2.2 of 3GPP TS 23.502 V16.3.0.

As shown in the step 4 of FIG. 5, [Conditional] new AMF to old AMF: Namf_Communication_UEContextTransfer (complete Registration Request) or new AMF to UDSF (Unstructured Data Storage Function): Nudsf_Unstructured Data Management_Query( ).

(With UDSF Deployment): If the UE's 5G-GUTI (5G Globally Unique Temporary Identifier) was included in the Registration Request and the serving AMF has changed since last Registration procedure, new AMF and old AMF are in the same AMF Set and UDSF is deployed, the new AMF retrieves the stored UE's SUPI and UE context directly from the UDSF using Nudsf_UnstructuredData Management_Query service operation or they can share stored UE context via implementation specific means if UDSF is not deployed. This includes also event subscription information by each NF consumer for the given UE. In this case, the new AMF uses integrity protected complete Registration request NAS message to perform and verify integrity protection.

(Without UDSF Deployment): If the UE's 5G-GUTI was included in the Registration Request and the serving AMF has changed since last Registration procedure, the new AMF may invoke the Namf_Communication_UEContextTransfer service operation on the old AMF including the complete Registration Request NAS message, which may be integrity protected, as well as the Access Type, to request the UE's SUPI and UE Context. See clause 5.2.2.2.2 of 3GPP TS 23.502 V16.3.0 for details of this service operation. In this case, the old AMF uses either 5G-GUTI and the integrity protected complete Registration request NAS (Non-Access Stratum) message, or the SUPI and an indication that the UE is validated from the new AMF, to verify integrity protection if the context transfer service operation invocation corresponds to the UE requested. The old AMF also transfers the event subscriptions information by each NF consumer, for the UE, to the new AMF. If the old AMF has not yet reported a non-zero MO (Mobile Originated) Exception Data Counter to the (H-)SMF, the Context Response also includes the MO Exception Data Counter.

If the old AMF has PDU Sessions for another access type (different from the Access Type indicated in this step) and if the old AMF determines that there is no possibility for relocating the N2 interface to the new AMF, the old AMF returns UE's SUPI and indicates that the Registration Request has been validated for integrity protection, but does not include the rest of the UE context.

The new AMF sets the indication that the UE is validated according to step 9a of FIG. 5, in case the new AMF has performed successful UE authentication after previous integrity check failure in the old AMF.

The NF consumers do not need to subscribe for the events once again with the new AMF after the UE is successfully registered with the new AMF.

If the new AMF has already received UE contexts from the old AMF during handover procedure, then steps 4, 5 and 10 of FIG. 5 shall be skipped.

For an Emergency Registration, if the UE identifies itself with a 5G-GUTI that is not known to the AMF, steps 4 and 5 are skipped and the AMF immediately requests the SUPI from the UE. If the UE identifies itself with PEI, the SUPI request shall be skipped. Allowing Emergency Registration without a user identity is dependent on local regulations.

As shown in the step 5 of FIG. 5, [Conditional] old AMF to new AMF: Response to Namf_Communication_UEContextTransfer (SUPI, UE Context in AMF (as per Table 5.2.2.2.2-1 of 3GPP TS 23.502 V16.3.0)) or UDSF to new AMF: Nudsf_Unstructured Data Management_Query( ). The old AMF may start an implementation specific (guard) timer for the UE context.

If the UDSF was queried in step 4 of FIG. 5, the UDSF responds to the new AMF for the Nudsf_Unstructured Data Management_Query invocation with the related contexts including established PDU Sessions, the old AMF includes SMF information DNN, S-NSSAI(s) and PDU Session ID, active NGAP (Next Generation Application Protocol) UE-TNLA (Transport Network Layer Association) bindings to N3IWF/TNGF/W-AGF, the old AMF includes information about the NGAP UE-TNLA bindings. If the Old AMF was queried in step 4 of FIG. 5, Old AMF responds to the new AMF for the Namf_Communication_UEContextTransfer invocation by including the UE's SUPI and UE Context.

If old AMF holds information about established PDU Session(s), the old AMF includes SMF information, DNN(s), S-NSSAI(s) and PDU Session ID(s).

If old AMF holds UE context established via N3IWF (Non-3GPP InterWorking Function), W-AGF (Wireline Access Gateway Function) or TNGF (Trusted Non-3GPP Gateway Function), the old AMF includes the CM (Connection Management) state via N3IWF, W-AGF or TNGF. If the UE is in CM-CONNECTED state via N3IWF, W-AGF or TNGF, the old AMF includes information about the NGAP UE-TNLA bindings.

If old AMF fails the integrity check of the Registration Request NAS message, the old AMF shall indicate the integrity check failure.

If old AMF holds information about AM Policy Association and the information about UE Policy Association (i.e. the Policy Control Request Trigger for updating UE Policy as defined in 3GPP TS 23.503 V16.3.0, the disclosure of which is incorporated by reference herein in its entirety), the old AMF includes the information about the AM Policy Association, the UE Policy Association and PCF ID. In the roaming case, V-PCF ID and H-PCF ID are included.

During inter PLMN mobility, the handling of the UE Radio Capability ID in the new AMF is as defined in 3GPP TS 23.501 V16.3.0.

When new AMF uses UDSF for context retrieval, interactions between old AMF, new AMF and UDSF due to UE signalling on old AMF at the same time is implementation issue.

As shown in the step 10 of FIG. 5, [Conditional] new AMF to old AMF: Namf_Communication_RegistrationCompleteNotify (PDU Session ID(s) to be released due to slice not supported).

If the AMF has changed the new AMF notifies the old AMF that the registration of the UE in the new AMF is completed by invoking the Namf_Communication_RegistrationCompleteNotify service operation.

If the authentication/security procedure fails, then the Registration shall be rejected, and the new AMF invokes the Namf_Communication_RegistrationCompleteNotify service operation with a reject indication reason code towards the old AMF. The old AMF continues as if the UE context transfer service operation was never received.

If one or more of the S-NSSAIs used in the old Registration Area cannot be served in the target Registration Area, the new AMF determines which PDU Session cannot be supported in the new Registration Area. The new AMF invokes the Namf_Communication_RegistrationCompleteNotify service operation including the rejected PDU Session ID and a reject cause (e.g. the S-NSSAI becomes no longer available) towards the old AMF. Then the new AMF modifies the PDU Session Status correspondingly. The old AMF informs the corresponding SMF(s) to locally release the UE's SM context by invoking the Nsmf_PDUSession_ReleaseSMContext service operation.

If new AMF received in the UE context transfer in step 2 the information about the AM Policy Association and the UE Policy Association and decides, based on local policies, not to use the PCF(s) identified by the PCF ID(s) for the AM Policy Association and the UE Policy Association, then it will inform the old AMF that the AM Policy Association and the UE Policy Association in the UE context is not used any longer and then the PCF selection is performed in step 15 of FIG. 5.

During N2 based handover execution phase, the step 12 of FIG. 4 explicitly specified that the target AMF performs only a subset of the registration procedure, specifically the steps 4, 5, and 10 in the registration procedure of FIG. 5 for the context transfer between the source AMF and target AMF are skipped.

Based on the above information, there is no way for the target AMF to get the NSSAA status of allowed NSSAIs subject to Network Slice-Specific Authentication and Authorization, the target AMF may have to execute step 25 of FIG. 5 again even the source AMF already has the NSSAA result.

To overcome or mitigate the above mentioned problems or other problems, the embodiments of the present disclosure propose an improved handover solution. In an embodiment, the source AMF may provide the target AMF the NSSAA status for allowed NSSAIs subject to Network Slice-Specific Authentication and Authorization during N2 based handover procedure preparation phase. In an embodiment, the target AMF, based on the NSSAA status from source AMF, may decide to skip the Network Slice-Specific Authentication and Authorization procedure in the registration procedure for the Network Slice-Specific Authentication and Authorization procedure and stores the NSSAA status from source AMF in the UE context for allowed S-NSSAIs subject to Network Slice-Specific Authentication and Authorization during the N2 based handover execution phase.

Figure 6:
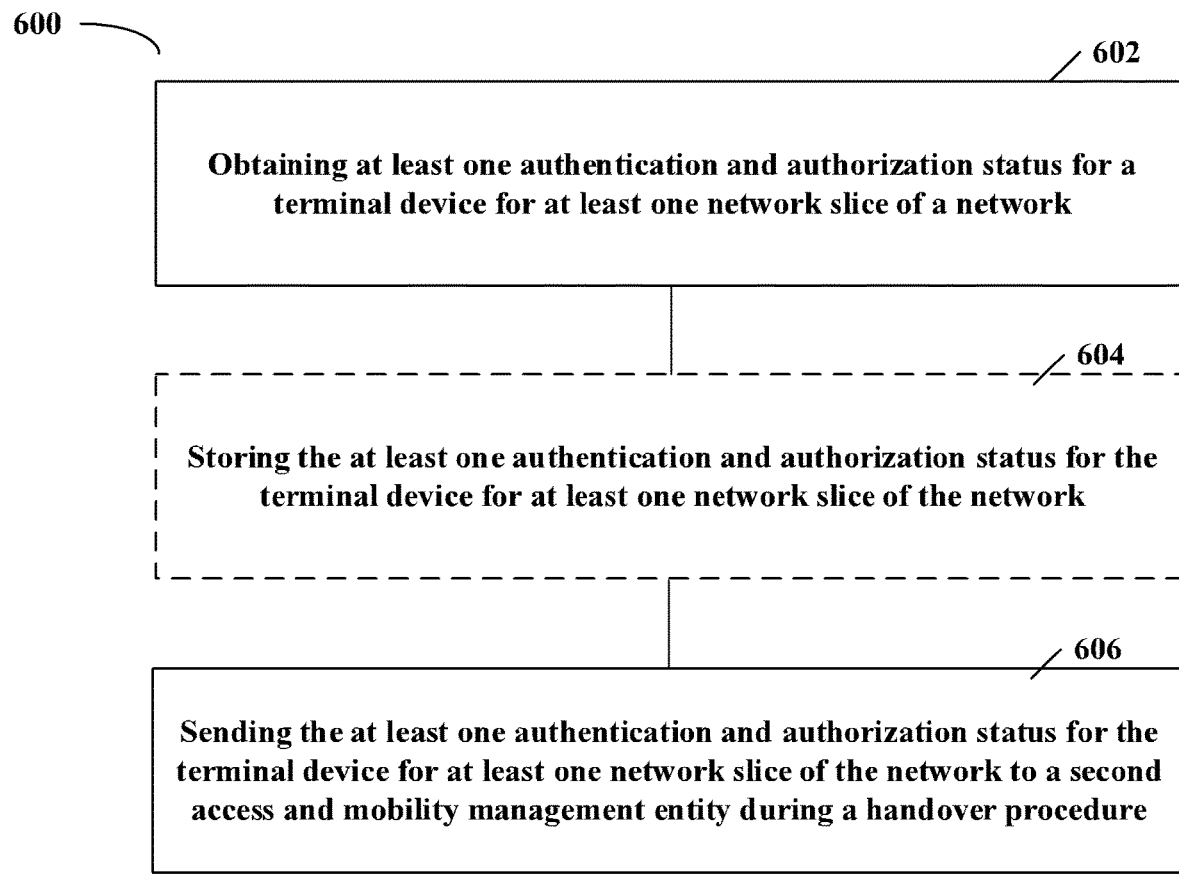
FIG. 6 shows a flowchart of a method according to an embodiment of the present disclosure.

FIG. 6 shows a flowchart of a method 600 according to an embodiment of the present disclosure, which may be performed by an apparatus implemented in or at or as a first access and mobility management entity such as AMF or communicatively coupled to the first access and mobility management entity. As such, the first access and mobility management entity may provide means or modules for accomplishing various parts of the method 600 as well as means or modules for accomplishing other processes in conjunction with other components.

At block 602, the first access and mobility management entity obtains at least one authentication and authorization status for a terminal device for at least one network slice of a network. A network slice may be a logical network that provides specific network capabilities and network characteristics. A network slice instance may be a set of network function instances and the required resources (e.g. compute, storage and networking resources) which form a deployed network slice. The network may be any suitable network including one or more network slices. For example, the network may be 5GS or other wireless communication systems.

A network slice may be identified in various ways. For example, a network slice may be identified by a network slice identifier. In an embodiment, each of the at least one network slice of the network may be identified by single network slice selection assistance information (S-NSSAI). The term "S-NSSAI" may be same as the corresponding term as described in 3GPP TS 23.501 V16.3.0.

The at least one authentication and authorization status for the terminal device for at least one network slice of the network may be obtained in various ways. In an embodiment, the at least one authentication and authorization status for the terminal device for at least one network slice of the network may be obtained from another access and mobility management entity and/or from an authentication server. For example, when the first access and mobility management entity is a target access and mobility management entity during a handover procedure where the access and mobility management entity serving the terminal device is changed from a source access and mobility management entity to the target access and mobility management entity, the first access and mobility management entity may obtain the at least one authentication and authorization status for the terminal device for at least one network slice of the network from the source access and mobility management entity. When the network slice-specific authentication and authorization procedure is triggered by the first access and mobility management entity, the first access and mobility management entity may obtain the at least one authentication and authorization status for the terminal device for at least one network slice of the network from the authentication server. In an embodiment, the authentication server may be an AUSF entity and said another access and mobility management entity may be an AMF entity. The AUSF may obtain the at least one authentication and authorization status from an AAA-S.

In an embodiment, the first access and mobility management entity may obtain the at least one authentication and authorization status for the terminal device for at least one network slice of the network according to Network Slice-Specific Authentication and Authorization procedure as described in clause 4.2.9 of 3GPP TS 23.502 V16.3.0.

The authentication and authorization status of a network slice may include information regarding whether network slice-specific authentication and authorization is required for the network slice and the result (such as success or failure) of network slice-specific authentication and authorization.

At block 604 (optionally), the first access and mobility management entity may store the at least one authentication and authorization status for the terminal device for at least one network slice of the network. For example, the first access and mobility management entity may store the at least one authentication and authorization status for the terminal device for at least one network slice of the network in the terminal device context for the terminal device, which could be used later for optimizations on UE re-registration procedure or provide (the latest authentication and authorization status if it has been updated) to another new target-access and mobility management entity during a handover procedure where the access and mobility management entity is changed.

At block 606, the first access and mobility management entity may send the at least one authentication and authorization status for the terminal device for at least one network slice of the network to a second access and mobility management entity during a handover procedure.

The handover procedure may be any suitable handover procedure that the access and mobility management entity serving the terminal device may be changed from the first access and mobility management entity to the second access and mobility management entity. In an embodiment, the handover procedure may be an inter next generation radio access network (NG-RAN) node N2 based handover procedure as described in clause 4.9.1.3 of 3GPP TS 23.502 V16.3.0.

The first and second access and mobility management entities may be any suitable network entity that can implement the access and mobility management function. In an embodiment, the first access and mobility management entity may be an AMF entity and the second access and mobility management entity may be an AMF entity.

The at least one authentication and authorization status for the terminal device for at least one network slice of the network may be sent in any suitable message that can be sent from the first access and mobility management entity to the second access and mobility management entity during the handover procedure. In an embodiment, the at least one authentication and authorization status for the terminal device for at least one network slice of the network may be sent in a request for the first access and mobility management entity to create a context of the terminal device in the second access and mobility management entity during the handover procedure. In an embodiment, the request may be a Namf_Communication_CreateUEContext Request as described in clause 4.9.1.3.2 of 3GPP TS 23.502 V16.3.0.

Figure 7:
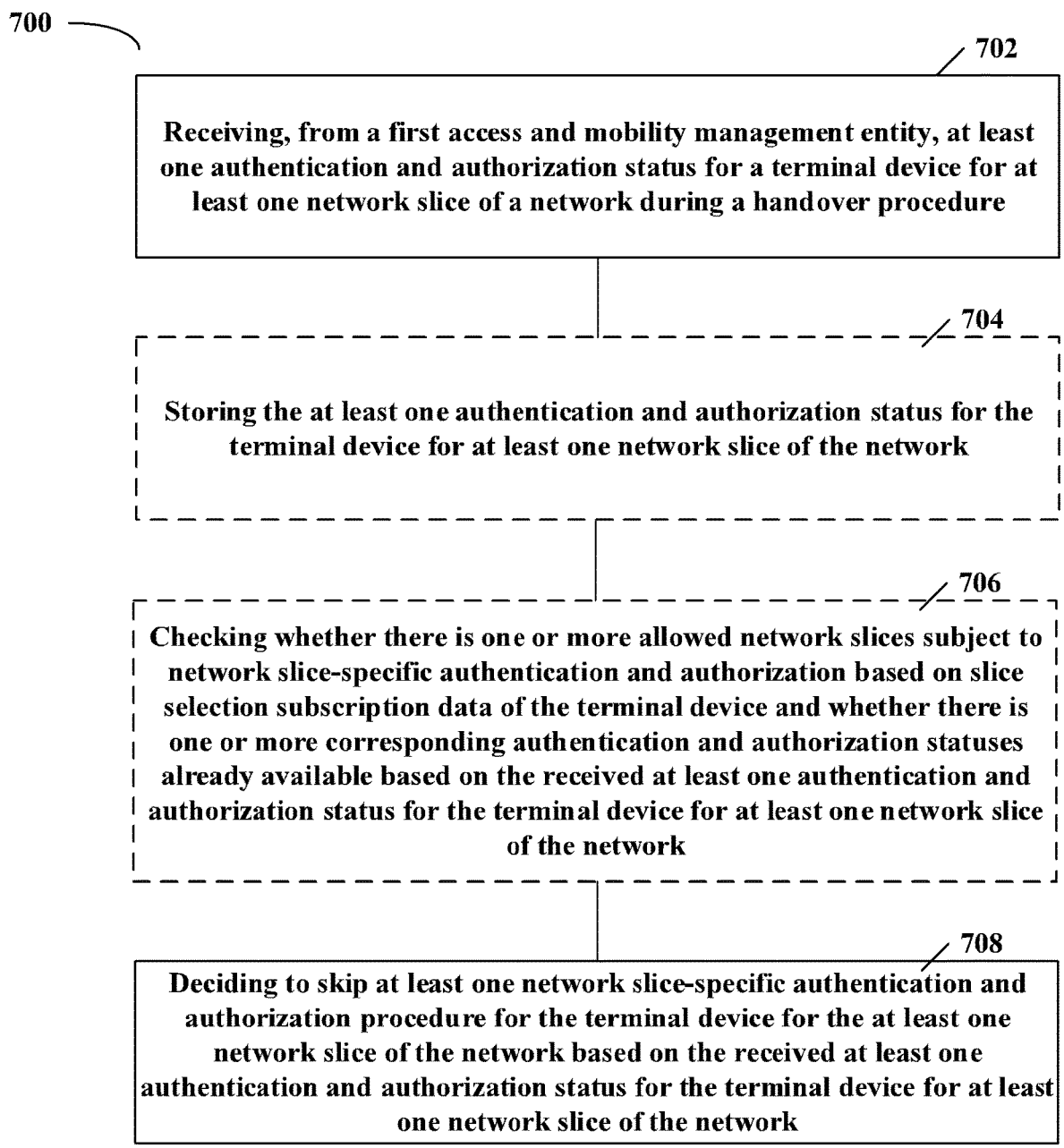
FIG. 7 shows a flowchart of a method according to another embodiment of the present disclosure.

FIG. 7 shows a flowchart of a method 700 according to another embodiment of the present disclosure, which may be performed by an apparatus implemented in or at or as a second access and mobility management entity such as AMF or communicatively coupled to the second access and mobility management entity. As such, the second access and mobility management entity may provide means or modules for accomplishing various parts of the method 700 as well as means or modules for accomplishing other processes in conjunction with other components. For some parts which have been described in the above embodiments, detailed description thereof is omitted here for brevity.

At block 702, the second access and mobility management entity receives, from a first access and mobility management entity, at least one authentication and authorization status for a terminal device for at least one network slice of a network during a handover procedure. For example, the first access and mobility management entity may send the at least one authentication and authorization status for the terminal device at block 606 of FIG. 6, then the second access and mobility management entity may receive the at least one authentication and authorization status.

At block 704 (optionally), the second access and mobility management entity may store the at least one authentication and authorization status for the terminal device for at least one network slice of the network. Block 704 is similar to block 604 of FIG. 6.

At block 706 (optionally), the second access and mobility management entity may check whether there is one or more allowed network slices subject to network slice-specific authentication and authorization based on slice selection subscription data of the terminal device and whether there is one or more corresponding authentication and authorization statuses already available based on the received at least one authentication and authorization status for the terminal device for at least one network slice of the network. The slice selection subscription data of the terminal device may be obtained from a data management entity such as UDM or from the first access and mobility management entity. For example, the second access and mobility management entity may request the slice selection subscription data from UDM. This request can only get the slice selection subscription data or can get the user access and mobility management data which contains the slice selection subscription data. UDM may return user slice selection subscription data to the second access and mobility management entity, UDM shall include the information of whether Network Slice-Specific Authentication and Authorization is required for each subscribed network slice such as S-NSSAI. The slice selection subscription data may include subscribed network slice(s) such as S-NSSAI(s) that the terminal device subscribes to. In roaming case, the subscribed network slices may indicate the subscribed network slices applicable to the serving PLMN. The slice selection subscription data may further include default network slice(s), e.g., the subscribed network slice(s) marked as default network slice. The slice selection subscription data may further include network slice(s) subject to Network Slice-Specific Authentication and Authorization, e.g., the subscribed network slice(s) marked as subject to Network Slice-Specific Authentication and Authorization. In an embodiment, the slice selection subscription data may be same as the slice selection subscription data as described in clause 5.2.3.3 of 3GPP TS 23.502 V16.3.0.

At block 708, the second access and mobility management entity may decide to skip at least one network slice-specific authentication and authorization procedure for the terminal device for the at least one network slice of the network based on the received at least one authentication and authorization status for the terminal device for at least one network slice of the network. As an example, supposing the authentication and authorization status for the terminal device is: for S-NSSAIs that NSSAA is required: {S-NSSAI1: success, S-NSSAI2: success, S-NSSAI3: failure} and for S-NSSAIs that NSSAA is not required: S-NSSAI4, the second access and mobility management entity may decide to skip the network slice-specific authentication and authorization procedures for the terminal device for S-NSSAI1, S-NSSAI2 and S-NSSAI3, wherein S-NSSAIx denotes a network slice x, "success" means that the network slice-specific authentication and authorization is successful, and "failure" means that the network slice-specific authentication and authorization is failed.

In an embodiment, the method further comprises skipping the at least one network slice-specific authentication and authorization procedure.

In an embodiment, the deciding to skip at least one network slice-specific authentication and authorization procedure further comprises deciding to skip at least one network slice-specific authentication and authorization procedure for the terminal device for the at least one network slice of the network if the received at least one authentication and authorization status indicates that the result of network slice-specific authentication and authorization is success.

In an embodiment, the deciding to skip at least one network slice-specific authentication and authorization procedure further comprises deciding to skip at least one network slice-specific authentication and authorization procedure for the terminal device for the at least one network slice of the network if the received at least one authentication and authorization status indicates that the result of network slice-specific authentication and authorization is failure.

In an embodiment, the at least one network slice-specific authentication and authorization procedure may be triggered for the at least one network slice requiring network slice-specific authentication and authorization with an AAA server which is hosted by an operator of the network or by a third party which has a business relationship with the network.

In an embodiment, the network slice-specific authentication and authorization procedure may be same as the corresponding network slice-specific authentication and authorization procedure as described in clause 4.2.9.2 of 3GPP TS 23.502 V16.3.0.

Figure 8A:
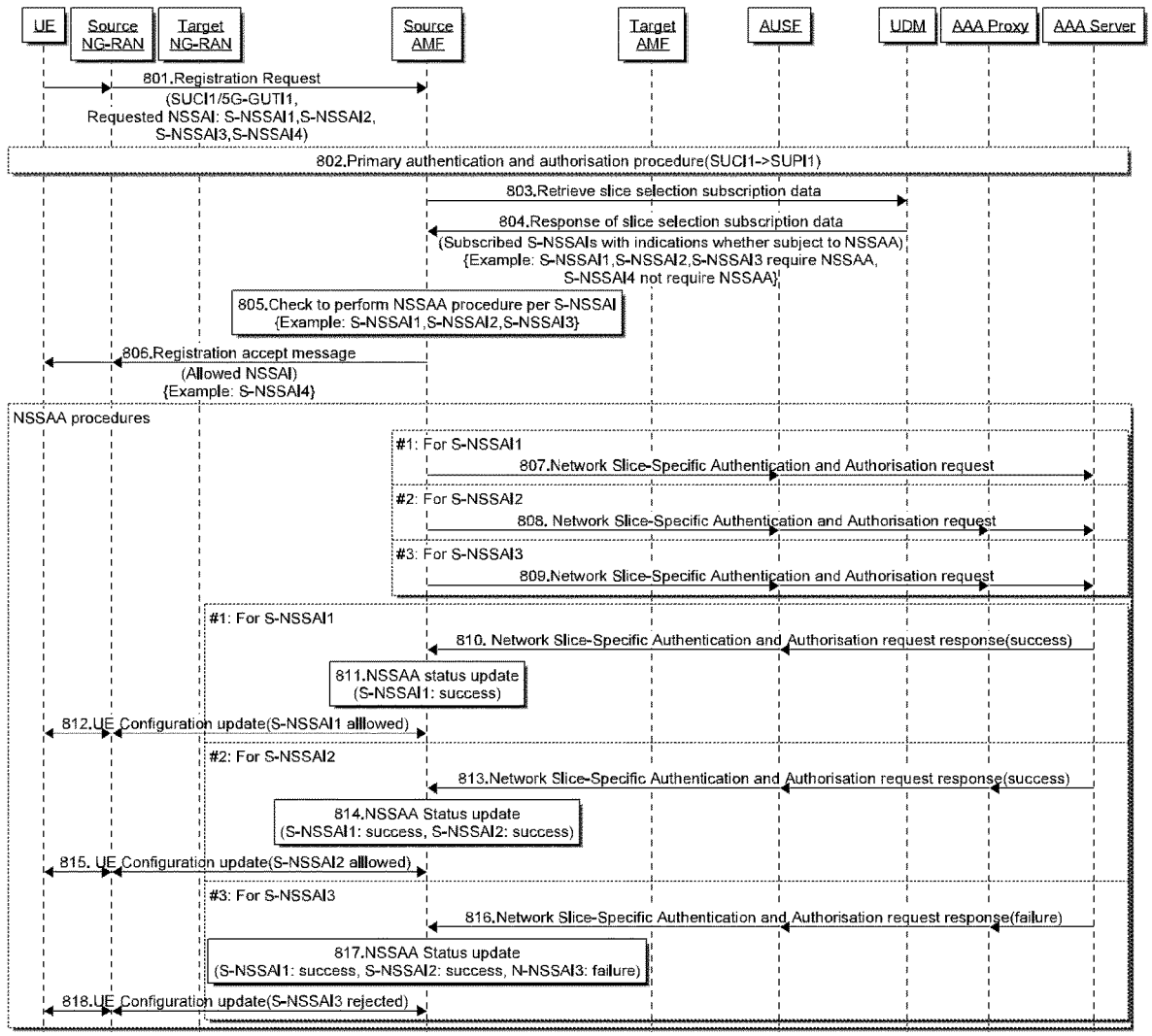
FIG. 8a depicts a flowchart of a UE registration procedure with Network Slice-Specific Authentication and Authorization (NSSAA) procedures in 5GS according to an embodiment of the present disclosure.

FIG. 8a depicts a flowchart of a UE registration procedure with NSSAA procedures in 5GS according to an embodiment of the present disclosure. As an example, the UE has subscribed four S-NSSAIs, and three of them are subject to Network Slice-Specific Authentication and Authorization, one of them is as a default S-NSSAI which doesn't require Network Slice-Specific Authentication and Authorization.

At step 801, UE sends a registration request to an AMF (i.e., Source-AMF in FIG. 8a) through the access network (source NG-RAN in FIG. 8a), the information contained in the request may include the user identity such as SUPI or 5G-GUTI, and the requested NSSAIs: S-NSSAI1, S-NSSAI2, S-NSSAI3, S-NSSAI4. For example, SUPI: imsi-xxxx, associated GPSI: msisdn-yyyy List of subscribed S-NSSAIs by the user, among which S-NSSAI4 is the default S-NS SAI:

```
S-NSSAI1:
{
  "sst": 2,
  "sd": "URLLC-SD1"
}
S-NSSAI2:
{
  "sst": 3,
  "sd": "mIOT-SD1"
}
S-NSSAI3:
{
  "sst": 4,
  "sd": "V2X-SD1"
}
S-NSSAI4:
{
  "sst": 1,
  "sd": "eMBB-SD1"
}
```

The UE may indicate in the Registration Request message in the UE 5GMM Core Network Capability whether it supports Network Slice-Specific Authentication and Authorization. If the UE does not support this feature, the AMF shall not trigger the NSSAA procedure for the UE and if the UE requests these S-NSSAIs that are subject to Network Slice-Specific Authentication and Authorization, they are rejected for the PLMN.

For simplicity in the later steps it is assumed that the UE supports Network Slice-Specific Authentication and Authorization feature.

It is also possible that the requested S-NSSAIs may need to be mapped to the HPLMN subscribed S-NSSAIs, but for simplicity in this embodiment it is assumed the mapping is straight forward as standardized SST (Slice/Service Type) value are used in this embodiment.

At step 802, if it is the initial registration, and the user identity is SUCI, AMF shall decide to trigger the primary authentication and authorization procedure for the PLMN access, once authenticated by the network, the corresponding SUPI for this SUCI is returned and AMF could keep the mapping in the context; or if it is not the initial registration and the user identity is 5G-GUTI, AMF could get the SUPI from the AMF context by 5G-GUTI and skip the primary authentication and authorization procedure.

At step 803, AMF requests the slice selection subscription data from UDM. This request can only get the slice selection subscription data or can get the user access and mobility management data which contains the slice selection subscription data.

At step 804, UDM returns user slice selection subscription data to AMF, UDM shall include the information of whether Network Slice-Specific Authentication and Authorization is required for each subscribed S-NSSAI, as an example defined as below (true means required, false means not required):

S-NSSAI1 requiredAuthnAuthz: true
S-NSSAI2 requiredAuthnAuthz: true
S-NSSAI3 requiredAuthnAuthz: true
S-NSSAI4 requiredAuthnAuthz: false At step 805: AMF parses the user slice selection subscription data to decide whether to trigger Network Slice-Specific Authentication and Authorization for each requested S-NS- SAI. As an example, S-NSSAI1, S-NSSAI2 and S-NSSAI3 are subject to Network Slice-Specific Authentication and Authorization.

At step 806, AMF sends a registration accept message to UE through access network, as an example the allowed NSSAI only contains S-NSSAI4 as it is subscribed by the user and Network Slice-Specific Authentication and Authorization is not required.

AMF triggers Network Slice-Specific Authentication and Authorization procedure for S-NSSAI1, S-NSSAI2, S-NSSAI3 as Network Slice-Specific Authentication and Authorization are required.

At step 807, AMF sends the Network Slice-Specific Authentication and Authorization request for S-NSSAI1, as an example, through AUSF to AAA server for cases AAA Server (AAA-S) hosted by the H-PLMN operator.

At step 808, AMF sends the Network Slice-Specific Authentication and Authorization request for S-NSSAI2, as an example, through AUSF, AAA proxy to AAA server for cases a AAA Proxy (AAA-P) in the serving PLMN may be involved e.g. if the AAA Server belongs to a third party.

At step 809, AMF sends the Network Slice-Specific Authentication and Authorization request for S-NSSAI3, as an example, through AUSF, AAA proxy to AAA server for cases a AAA Proxy (AAA-P) in the serving PLMN may be involved e.g. if the AAA Server belongs to a third party.

At step 810, AMF gets the result (e.g., success) of the Network Slice-Specific Authentication and Authorization for S-NSSAI1, as an example from AAA server, AUSF to AMF.

At step 811, AMF stores the NSSAA status for S-NSSAI1 in UE context: {S-NSSAI1: success}.

At step 812, AMF sends the UE configuration update to UE through the access network, as an example update the allowed NSSAI to include S-NSSAI1 as allowed.

At step 813, AMF gets the result (e.g., success) of the Network Slice-Specific Authentication and Authorization for S-NSSAI2, as an example from AAA server, AAA proxy AUSF to AMF.

At step 814, AMF stores the NSSAA status for S-NSSAI2 in UE context: {S-NSSAI2: success}.

At step 815, AMF sends the UE configuration update to UE through the access network, as an example update the allowed NSSAI to include S-NSSAI2 as allowed.

At step 816: AMF gets the result (e.g., failure) of the Network Slice-Specific Authentication and Authorization for S-NSSAI3, as an example from AAA server, AAA proxy, AUSF to AMF.

At step 817, AMF stores the NSSAA status for S-NSSAI3 in UE context: {S-NSSAI3: failure}.

At step 818, AMF sends the UE configuration update to UE through the access network, as an example update the allowed NSSAI to include S-NSSAI3 as rejected and the cause.

Please note that the Network Slice-Specific Authentication and Authorization result for S-NSSAI1, S-NSSAI2, S-NSSAI3 are updated to UE separately in this embodiment, it is also possible that multiple results are contained in one configuration update to UE.

Figure 8B:
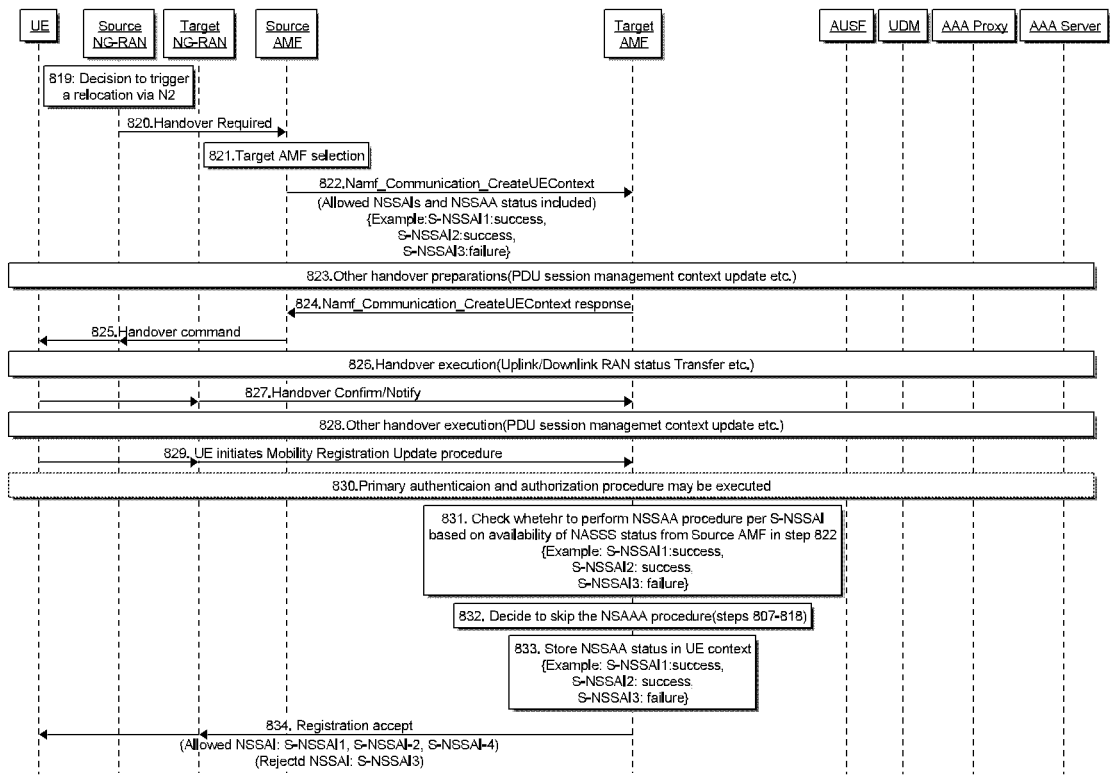
FIG. 8b depicts a flowchart of N2 based handover with optimized NSSAA procedures according to an embodiment of the present disclosure.

FIG. 8b depicts a flowchart of N2 based handover with optimized NSSAA procedures according to an embodiment of the present disclosure. FIG. 8b is a continued call flow of FIG. 8a for the same user due to mobility.

The step 822 of FIG. 8b is introduced for the source AMF to provide the NSSAA status which already got during the registration procedure as described in FIG. 8a to the target AMF, so after N2 based handover during UE initiated mobility registration update, the target AMF could optimize the NSSAA procedure in steps 831-832 of FIG. 8b based on the NSSAA status from the source AMF to skip the Network Slice-Specific Authentication and Authorization procedures already taken in FIG. 8a and store the NSSAA status in the UE context in the target AMF, which avoids unnecessary signaling traffic (steps 807-818 of FIG. 8a) and improved the handover performance measured in delay.

At step 819, the source NG-RAN decides to initiate an N2-based handover to the target NG-RAN. This can be triggered, for example, due to new radio conditions or load balancing.

At step 820, the source-RAN to the Source-AMF: Handover Required (Target ID, Source to Target transparent container, SM N2 info list, PDU Session IDs, intra system handover indication).

At step 821, Target-AMF Selection: when the Source-AMF can't serve the UE anymore, the Source-AMF selects the Target-AMF.

At step 822, Source-AMF to Target-AMF: Namf_Communication_CreateUEContext Request.

For the UE context information, besides the Allowed NSSAI for each Access Type, the NSSAA status (e.g. success/failure) for Allowed NSSAI subject to Network Slice-Specific Authentication and Authorization is also contained.

As an example:

For S-NSSAIs that NSSAA is required: {S-NSSAI1: success, S-NSSAI2: success, S-NSSAI3: failure}.

For S-NSSAIs that NSSAA is not required: S-NSSAI4.

At step 823, other operations for N2 based handover preparations, such as PDU session management context update between SMF, UPFs (Target-UPF, Source-UPF, Anchor-UPF), etc.

At step 824, Target-AMF to Source-AMF: Namf_Communication_CreateUEContext Response.

At step 825, Source-AMF to Source-RAN to UE: Handover Command.

At step 826, the Source-RAN sends the Uplink RAN Status Transfer message to the Source-AMF. The Target-AMF sends the information to the Target-RAN via the Downlink RAN Status Transfer.

At step 827, UE to Target-RAN: Handover Confirm. After the UE has successfully synchronized to the target cell, it sends a Handover Confirm message to the Target-RAN. Handover is by this message considered as successful by the UE.

Target-RAN to Target-AMF: Handover Notify, Handover is by this message considered as successful in Target-RAN.

At step 828, other operations for N2 based handover execution, such as PDU session management context update between SMF, UPF (Source-UPF, Target-UPF, Anchor-UPF), etc.

At step 829, the UE initiates Mobility Registration Update procedure.

At step 830, the Target-AMF may decide to initiate primary authentication and authorization procedure or not based on the local policy and security context.

Step 831-step 833 are new steps compared to prior arts.

At step 831, the Target AMF checks whether there are allowed NSSAI subject to Network Slice-Specific Authentication and Authorization based on the slice selection subscription data from step 804 of FIG. 8a and whether the corresponding NSSAA status are already available (with the help of the step 822 from the Source-AMF).

At step 832, based on availability of the NSSAA status from step 22, the Target-AMF decides to skip the Network Slice-Specific Authentication and Authorization procedures for S-NSSAIs subject to Network Slice-Specific Authentication and Authorization.

If the NSSAA status is not provided by the Source-AMF during the N2 based handover procedure, the Target-AMF must execute the Network Slice-Specific Authentication and Authorization procedures. In this embodiment, steps 807-818 of FIG. 8a must be executed again. So, it is obvious that with the proposed step 822 for the Source-AMF to provide the Target-AMF the NSSAA status, NSSAA procedures at the Target-AMF could be optimized, unnecessary network signaling traffic for NSSAA procedures is avoided during N2 based handover procedure. Advantages of the proposed solution may include: for the subscriber, fast service response time and minimized delay for the N2 based handover procedure can be achieved and for the network operator, OPEX reduction can be achieved as unnecessary signaling is avoided and the network performance is improved.

At step 833, the Target-AMF stores the NSSAA status in the UE context for the UE, which could be used later for optimizations on UE re-registration procedure or provides the latest NSSAA status (if updated) to another new Target-AMF during N2 based handover procedure At step 834, Registration accept is sent back to the UE with NSSAA status, as an example:
For S-NSSAIs NSSAA required: {S-NSSAI1: success, S-NSSAI2: success, S-NSSAI3: failure},
For S-NSSAIs NSSAA not required: S-NSSAI4.

Some messages as shown in FIGS. 8a and 8b are same as the corresponding messages as described in 3GPP TS 23.502 V16.3.0.

The various blocks shown in FIGS. 6, 7, 8a and 8b may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Embodiments herein afford many advantages, of which a non-exhaustive list of examples follows. In some embodiments herein, during N2 based handover procedure, the target AMF could optimize the NSSAA procedure based on NSSAA status for allowed NSSAIs subject to Network Slice-Specific Authentication and Authorization during N2 based handover procedure provided by source AMF. In some embodiments herein, unnecessary network signaling traffic may be avoided during N2 based handover procedure. In some embodiments herein, for subscriber, fast service response time and minimized delay for the N2 based handover procedure may be achieved. In some embodiments herein, for network operator, OPEX reduction may be achieved as unnecessary signaling is avoided and network performance is improved. A person skilled in the art will recognize additional features and advantages upon reading the following detailed description.

Figure 9:
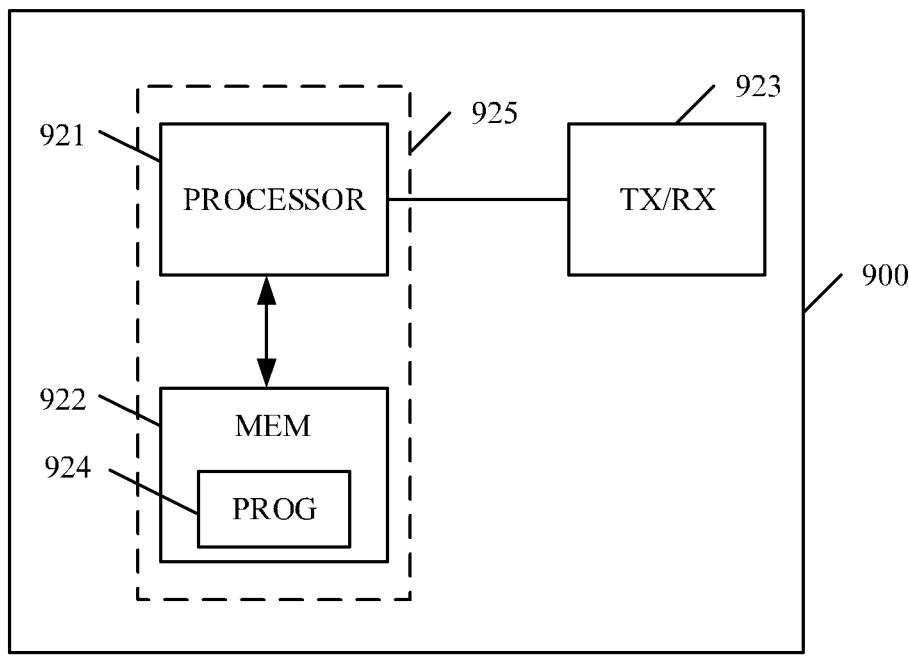
FIG. 9 is a block diagram showing an apparatus suitable for practicing some embodiments of the disclosure.

FIG. 9 is a block diagram showing an apparatus suitable for practicing some embodiments of the disclosure. For example, any one of the first access and mobility management entity and the second access and mobility management entity described above may be implemented as or through the apparatus 900.

The apparatus 900 comprises at least one processor 921, such as a DP, and at least one MEM 922 coupled to the processor 921. The apparatus 920 may further comprise a transmitter TX and receiver RX 923 coupled to the processor 921. The MEM 922 stores a PROG 924. The PROG 924 may include instructions that, when executed on the associated processor 921, enable the apparatus 920 to operate in accordance with the embodiments of the present disclosure. A combination of the at least one processor 921 and the at least one MEM 922 may form processing means 925 adapted to implement various embodiments of the present disclosure.

Various embodiments of the present disclosure may be implemented by computer program executable by one or more of the processor 921, software, firmware, hardware or in a combination thereof.

The MEM 922 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 921 may be of any type suitable to the local technical environment, and may include one or more of general purpose computers, special purpose computers, microprocessors, digital signal processors (DSPs) and processors based on multicore processor architecture, as non-limiting examples.

In an embodiment where the apparatus is implemented as or at the first access and mobility management entity, the memory 922 contains instructions executable by the processor 921, whereby the first access and mobility management entity operates according to any of the method 600 as described in reference to FIG. 6.

In an embodiment where the apparatus is implemented as or at the second access and mobility management entity, the memory 922 contains instructions executable by the processor 921, whereby the second access and mobility management entity operates according to the method 700 as described in reference to FIG. 7.

Figure 10:
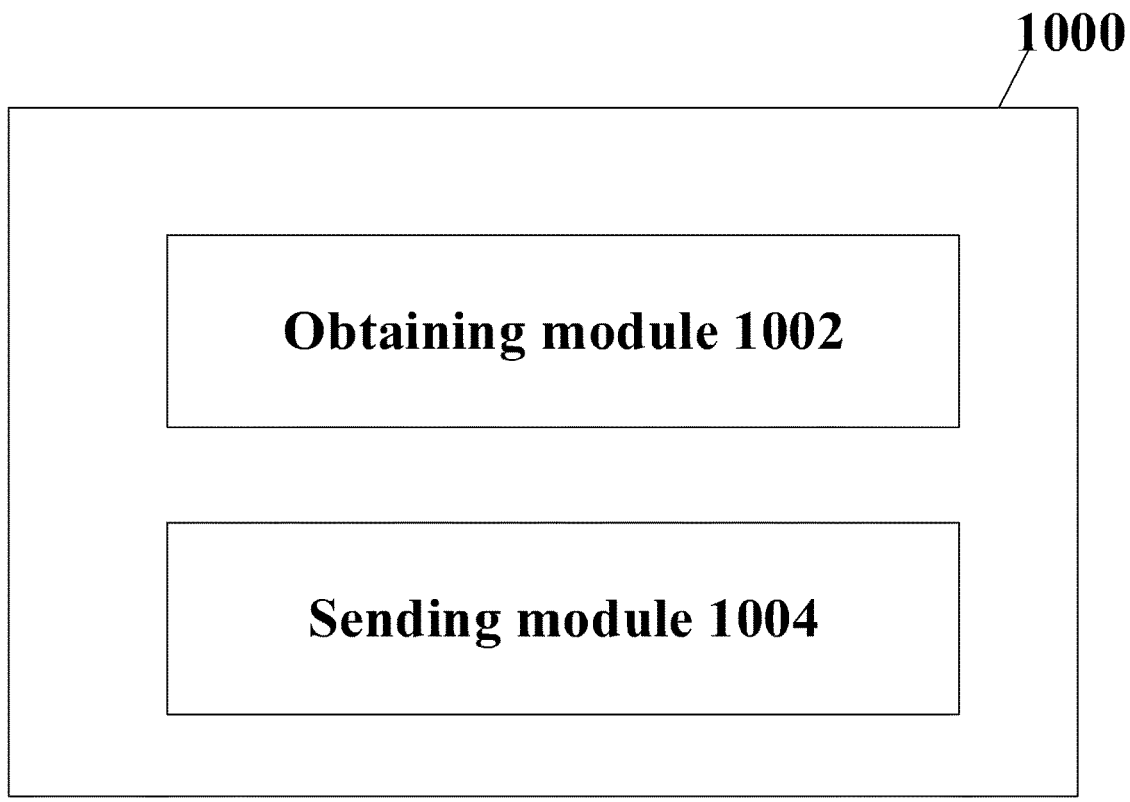
FIG. 10 is a block diagram showing a first access and mobility management entity according to an embodiment of the disclosure.

FIG. 10 is a block diagram showing a first access and mobility management entity according to an embodiment of the disclosure. As shown, the first access and mobility management entity 1000 comprises an obtaining module 1002 and a sending module 1004. The obtaining module 1002 may be configured to obtain at least one authentication and authorization status for a terminal device for at least one network slice of a network. The sending module 1004 may be configured to send the at least one authentication and authorization status for the terminal device for at least one network slice of the network to a second access and mobility management entity during a handover procedure.

Figure 11:
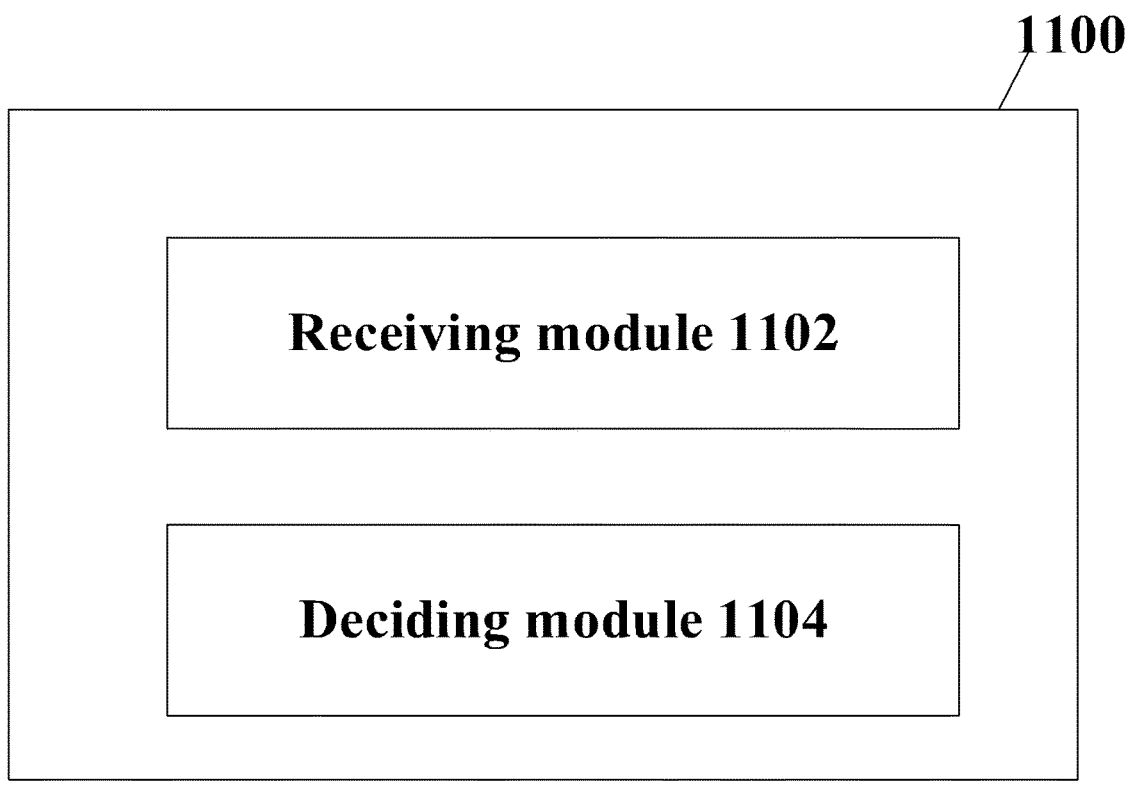
FIG. 11 is a block diagram showing a second access and mobility management entity according to an embodiment of the disclosure.

FIG. 11 is a block diagram showing a second access and mobility management entity according to an embodiment of the disclosure. As shown, the second access and mobility management entity 1100 comprises a receiving module 1102 and a deciding module 1104. The receiving module 1102 may be configured to receive, from a first access and mobility management entity, at least one authentication and authorization status for a terminal device for at least one network slice of a network during a handover procedure. The deciding module 1104 may be configured to decide to skip at least one network slice-specific authentication and authorization procedure for the terminal device for the at least one network slice of the network based on the received at least one authentication and authorization status for the terminal device for at least one network slice of the network.

The term unit or module may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With function units, the first access and mobility management entity and the second access and mobility management entity may not need a fixed processor or memory, any computing resource and storage resource may be arranged from the first access and mobility management entity and the second access and mobility management entity in the communication system. The introduction of virtualization technology and network computing technology may improve the usage efficiency of the network resources and the flexibility of the network.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function or means that may be configured to perform one or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method at a second access and mobility management entity, comprising:
receiving, from a first access and mobility management entity, at least one authentication and authorization status for a terminal device for at least one network slice of a network during a handover procedure;
deciding to skip at least one network slice-specific authentication and authorization procedure for the terminal device for the at least one network slice of the network based on the received at least one authentication and authorization status that indicates that a result of the network slice-specific authentication and authorization was successful or was a failure; and
skipping the at least one network slice-specific authentication and authorization procedure.

2. The method according to claim 1, further comprising:
checking whether there is one or more allowed network slices subject to network slice-specific authentication and authorization based on slice selection subscription data of the terminal device and whether there is one or more corresponding authentication and authorization statuses already available based on the received at least one authentication and authorization status for the terminal device for at least one network slice of the network.

3. The method according to claim 1, wherein each of the at least one network slice of the network is identified by single network slice selection assistance information, S-NSSAI.

4. The method according to claim 1, wherein the handover procedure is an inter next generation radio access network, NG-RAN, node N2 based handover procedure.

5. The method according to claim 1, wherein the first access and mobility management entity is an access and mobility management function, AMF, entity and the second access and mobility management entity is an AMF entity.

6. The method according to claim 1, wherein the at least one authentication and authorization status for the terminal device for at least one network slice of the network is obtained from another access and mobility management entity and/or from an authentication server.

7. The method according to claim 6, wherein the authentication server is an authentication server function, AUSF, entity and said another access and mobility management entity is an access and mobility management function, AMF, entity.

8. The method according to claim 1, wherein the at least one authentication and authorization status for the terminal device for at least one network slice of the network is received in a request for the first access and mobility management entity to create a context of the terminal device in the second access and mobility management entity during the handover procedure.

9. The method according to claim 8, wherein the request is a Namf_Communication_CreateUEContext Request.

10. The method according to claim 1, further comprising:
storing the at least one authentication and authorization status for the terminal device for at least one network slice of the network.

11. The method according to claim 1, wherein the at least one network slice-specific authentication and authorization procedure is triggered for the at least one network slice requiring network slice-specific authentication and authorization with an authentication, authorization and accounting, AAA, server which is hosted by an operator of the network or by a third party which has a business relationship with the network.

12. A second access and mobility management entity, comprising:
a processor; and
a memory coupled to the processor, said memory containing instructions executable by said processor, whereby said second access and mobility management entity is operative to:
receive, from a first access and mobility management entity, at least one authentication and authorization status for a terminal device for at least one network slice of a network during a handover procedure;
decide to skip at least one network slice-specific authentication and authorization procedure for the terminal device for the at least one network slice of the network based on the received at least one authentication and authorization status that indicates that a result of the network slice-specific authentication and authorization was successful or was a failure; and
skipping the at least one network slice-specific authentication and authorization procedure.

13. The second access and mobility management entity of claim 12 wherein second access and mobility management entity is further operative to:
check whether there is one or more allowed network slices subject to network slice-specific authentication and authorization based on slice selection subscription data of the terminal device and whether there is one or more corresponding authentication and authorization statuses already available based on the received at least one authentication and authorization status for the terminal device for at least one network slice of the network.

14. The second access and mobility management entity of claim 12, wherein each of the at least one network slice of the network is identified by single network slice selection assistance information, S-NSSAI.

15. The second access and mobility management entity of claim 12, wherein the handover procedure is an inter next generation radio access network, NG-RAN, node N2 based handover procedure.

* * * * *